Sept. 9, 1969  G. K. E. KLEEBERG  3,466,005
REMOTE CONTROL VALVE OPERATING MECHANISM
Filed Aug. 8, 1966
3 Sheets-Sheet 1
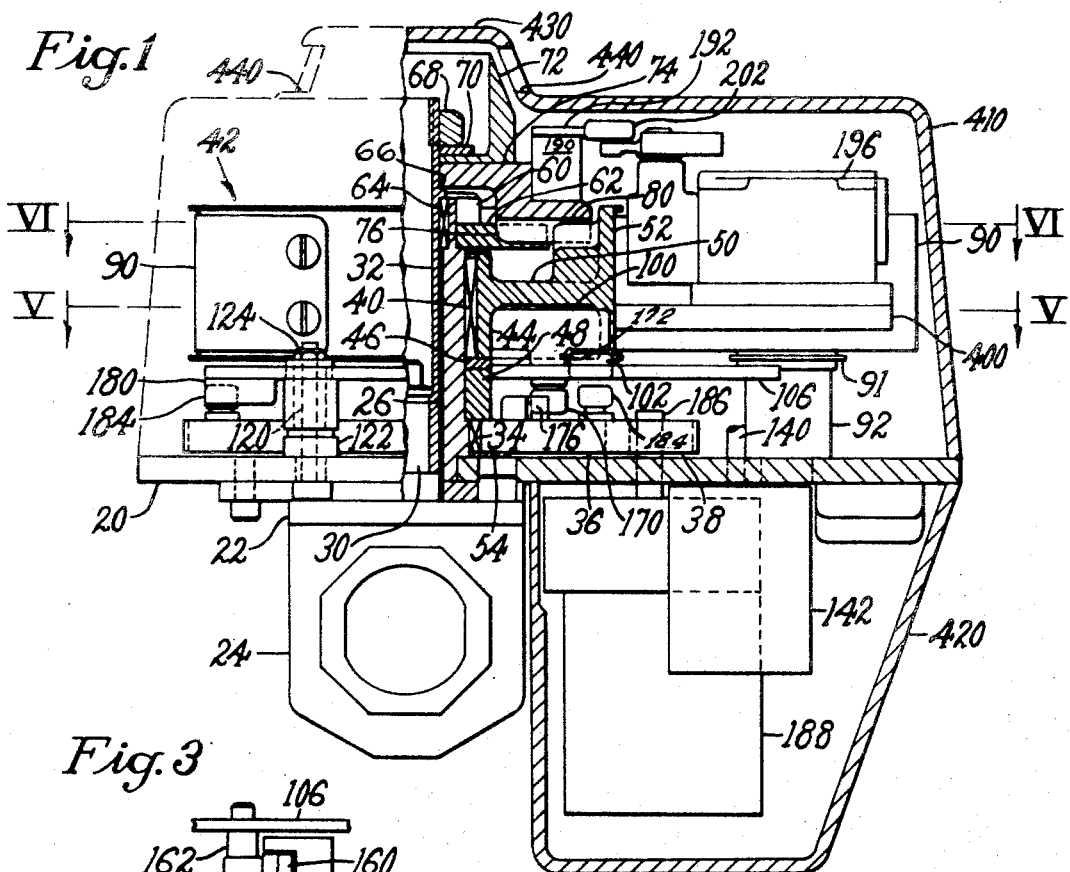
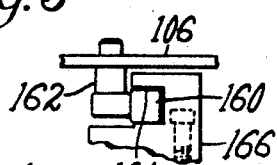
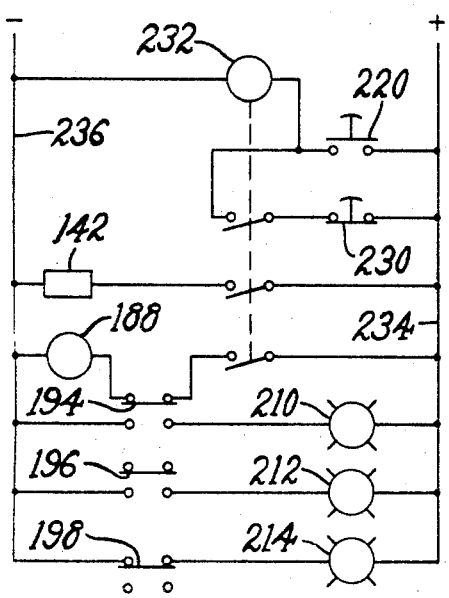
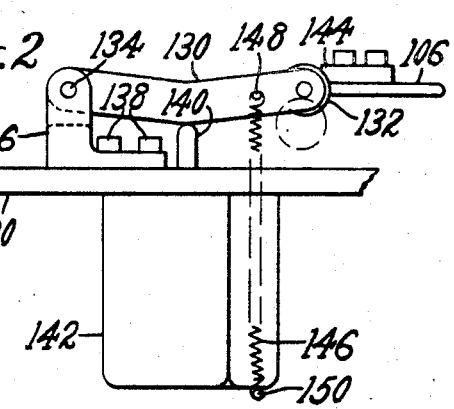
Inventor
Gunther K. E. Kleeberg
By his Attorney
Everet D. Littlefield Sept. 9, 1969  G. K. E. KLEEBERG  3,466,005
REMOTE CONTROL VALVE OPERATING MECHANISM
Filed Aug. 8, 1966  3 Sheets-Sheet 2

United States Patent Office 3,466,005
Patented Sept. 9, 1969

3,466,005
REMOTE CONTROL VALVE OPERATING MECHANISM
Gunther K. E. Kleeberg, Lexington, Mass., assignor, by mesne assignments, to E.B.V. Systems, Inc., Warwick, R.I., a corporation of Maryland
Filed Aug. 8, 1966, Ser. No. 570,874
Int. Cl. F16k 31/06, 31/44
U.S. Cl. 251—69                                         15 Claims

ABSTRACT OF THE DISCLOSURE

Valve operating mechanism in which a rotatably mounted drum is connected to the valve stem and urged by a spring in a direction to close the valve, characterized by a gear motor for rotating the drum in the opposite direction to open the valve and means acting directly on the drum and including a solenoid for holding the valve in open position when the solenoid is energized and for releasing the drum to the action of the spring to close the valve independently of the gear motor, when the solenoid is deenergized, either intentionally or as the result of power failure.

---

This invention relates to valve operating mechanisms and is herein illustrated as embodied in mechanism for operating a rotary ball valve of the type, for example, disclosed in U.S. Letters Patent 3,164,362, issued Jan. 5, 1965, on an application filed in the name of Francois I. Lavigueur.

The use of remotely located rotary valves for controlling the flow of liquids, gases, etc., to various parts of an industrial plant is a common and widespread practice and it has been proposed to provide operating mechanisms for such valves by means of which the valves may be opened and closed from a centrally located control station. Commonly, these valve operating mechanisms are biased toward a closed position and are adapted to be released for movement to closed position by the biasing means in the event of power failure. Hitherto, valve operating mechanisms of this type have been rather complicated in construction as well as quite expensive, especially those made for use with the larger valve sizes. Moreover, such mechanisms are quite commonly fabricated on the spot with readily available components which are often ill-suited for use in the combination. Such arrangements are usually quite complicated and not likely to provide the dependable operation required for safe service.

It is a principle object of this invention to provide a novel and improved mechanism for operating a rotary valve which is of relatively uncomplicated mechanical design and yet at the same time is most satisfactory and dependable in operation. With this object in view, and in accordance with features of this invention, the herein illustrated valve operating mechanism has a base member adapted to be mounted adjacent the valve to be operated and on which a valve operating drum is rotatably mounted. Means are provided, preferably a constant torque spring, for exerting a uniform force tending to rotate the drum in one direction to close the valve, together with means for releasably holding or latching the drum against rotation in that direction and means for rotating the drum in the opposite direction against the resistance of the spring for opening the valve. Cooperating drive means are associated with the drum and the stem of the valve and, in accordance with another feature of the invention, these drive means are arranged to provide a lost motion between rotation of the drum and the resulting rotation of the valve stem, thus providing high impact to overcome the initial static friction of the valve and insure its instant fail-safe closure when the drum is unlatched.

Preferably, and in accordance with other features of the invention, the means for holding the drum against rotation in the direction to close the valve includes a latch lever pivotally mounted on the drum, a gate member pivotally mounted on the base member for movement between operative and inoperative positions, a spring for moving the gate member to inoperative position, a latch arm for engaging the gate member to hold it against movement by said spring and a solenoid having an armature for holding the latch arm in engagement with the gate member when its coil is energized. With this arrangement, the latch lever engages the gate member to hold the drum against rotation in a direction to close the valve so long as the coil of the solenoid is energized but upon deenergization of the coil the gate member is instantly moved to its inoperative position by its associated spring and the drum is fully released for rotation by the constant torque spring to close the valve.

Finally, in accordance with still further features of the invention the means for rotating the drum against the resistance of the constant torque spring to open the valve and latch the drum in valve open position comprises a driven rotary member mounted on the base member and provided with a pair of lugs for first moving the gate member back to operating position and then rotating the drum in the opposite direction, to bring the latch lever into engagement with the gate member. In one form of the invention herein illustrated, wherein cooperating drive means are provided on the drum and valve stem, such rotation of the drum returns the valve to open position. In a modified arrangement, also shown, the return of the gate member to operative position and the rotation of the drum to bring the latch lever into engagement with the gate member is effected during an initial period of rotation of the driven rotary member following which the valve is moved to open position by a continued rotation of the rotary member. By thus separating these operations, the power requirements of the driven rotary member are substantially reduced.

The above and other objects and features of the invention will appear in the following detailed description of the embodiments illustrated in the accompanying drawings and will be pointed out in the claims.

In the drawings:

FIG. 1 is a view partly in end elevation and partly in vertical section showing a valve operating mechanism embodying the features of this invention mounted on the casing of a conventional ball valve;

FIG. 2 is a detail view of a part of the valve operating mechanism;

FIG. 3 is a detail view of another part of the valve operating mechanism;

FIG. 4 is an electrical diagram;

Figure 5:
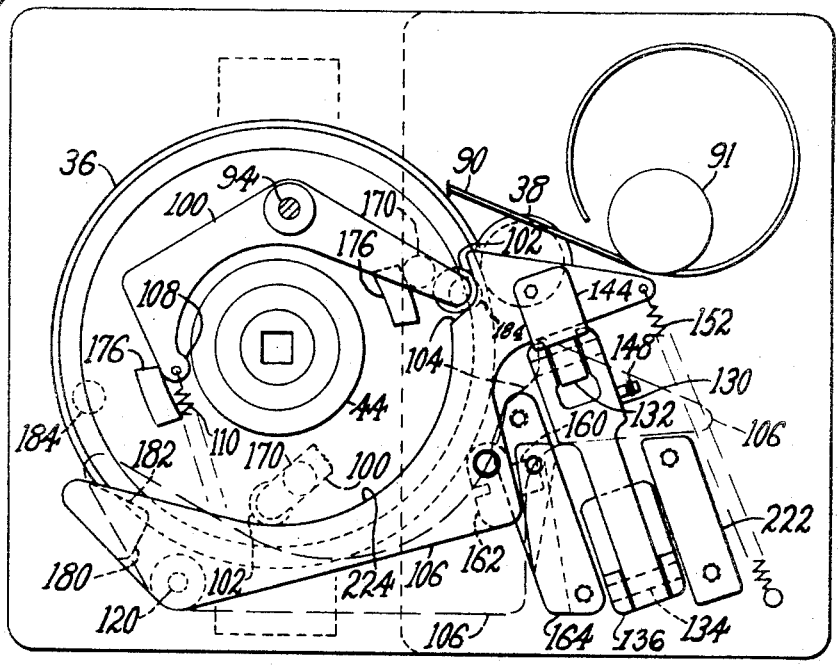
FIG. 5 is a plan of the valve operating mechanism as viewed from a plane indicated by a line V—V of FIG. 1 and looking in the direction of the arrows.

Referring to these drawings and particularly FIG. 1 thereof, the valve operating mechanism therein disclosed is associated with a base plate or platform member 20 which is adapted to be supported on and secured, in any suitable manner, to the casing 22 of a ball valve 24. Mounted on and extending upwardly from the base plate is a hollow cylindrical post 26 which surrounds the valve stem 30 and a valve stem extension 32. Rotatably mounted on the lower portion of the post 26, by means of a bearing 34, is a main driven gear 36 which meshes with a pinion 38. Also rotatably mounted on the post 26, by means of a bearing 40, is a spring drum 42. This drum has a central hub portion 44, which rests on a thrust washer 46 supported on a spacer bushing 48, a radially extending central web 50 and an outer cylindrical flange portion 52. A thrust washer 54 is also provided for supporting the gear 36.

Figure 6:
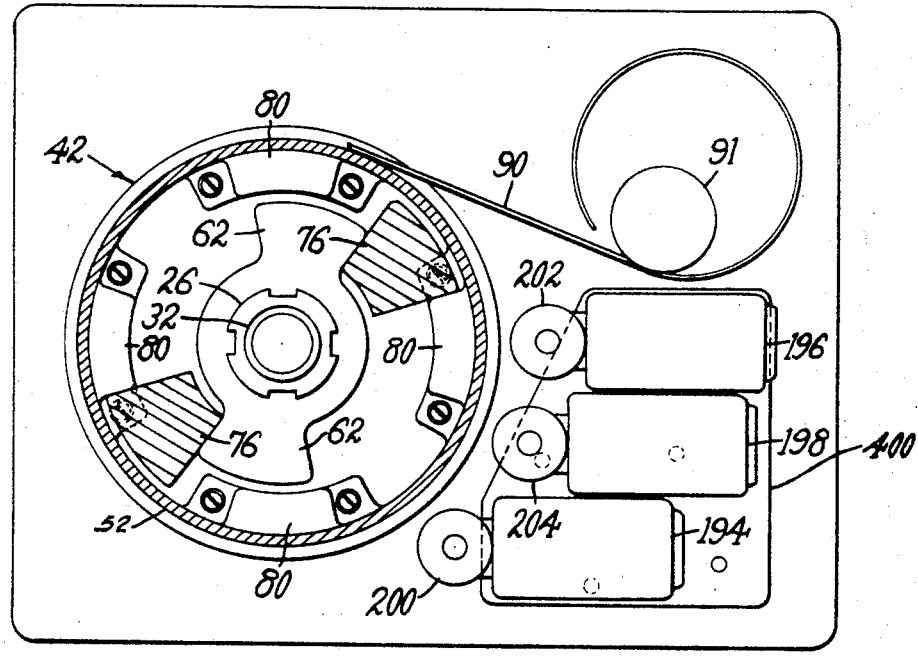
FIG. 6 is a view in horizontal section substantially on line VI—VI of FIG. 1 looking in the direction of the arrows.

Keyed to, and clamped against a shoulder on the upper end of the post 26, by means of a lock nut 60, is a fixed stop member 62, see also FIG. 6. The valve stem extension 32 extends upwardly beyond the post 26 and is rotatably supported therein by means of a bearing 64. Directly above this bearing, the valve stem extension is provided with a shoulder 66 and clamped against this shoulder by means of a nut 68, washer 70 and an indicator cup 72, is a disc-like member 74 provided with two downwardly projecting diametrically disposed lugs 76—76 see also FIG. 6.

Formed on the upper side of the web 50 of the drum 42, between it and the flange 52 are four driving lugs 80. Two of these lugs are adapted to engage one side of the lugs 76 on the member 74, when the drum 42 is rotated in a clockwise direction, as viewed in FIG. 6 and thus to effect turning of the valve stem through an angle of approximately 90°, from the open position in which it is shown to closed position, while the other two of the lugs 80 are adapted to engage the opposite side of the lugs 76 and return the valve to open position. As can be seen in FIG. 6 the spacing between the lugs 76, 76 on the member 74 and the lugs 80 on the disc is such that there is about 20° of lost motion provided before rotation of the drum 42 in either direction is transmitted to the member 74 and thence to the valve stem. The impact thus imparted to the valve stem by the momentum of the rotating drum overcomes the static friction between the ball valve and the usual sealing members associated therewith and thus exerts the forces necessary to close the valve.

Wrapped partly around and secured to the periphery of the drum 42 is one end of a constant torque spring 90 the other end of which is wrapped around and in engagement with a small drum 91 rotatably mounted on abutment post 92 which extends upwardly from the base plate 30, FIGS. 1, 5 and 6. This spring exerts a uniform force on the drum 42 tending to turn it in a clockwise direction as viewed in FIG. 6. For preventing such rotation of the drum and thus holding the parts in the position shown in FIG. 6 with the valve opened, the following mechanism is provided. Pivotally mounted on the lower side of the web portion 50 of the spring drum, by means of a stud 94, is a latch lever 100. On one arm of this lever is a roll 102 adapted to engage a notch 104 formed in a gate member 106. The other arm of the lever 100 has a rounded end 108 which is adapted, at times, to engage the hub 44 of the drum and thus limit the swinging movement of the lever in a counter-clockwise direction, FIG. 5 under the influence of a tension spring 110, stretched between that end of the lever and an anchor pin, not shown, carried by the drum.

The gate member 106 is pivotally mounted on a trunnion bolt 120 which extends upwardly from a boss 122 on the base plate 20 and is held on the bolt by means of a nut 124, FIG. 1. The gate member 106 is held in the operative position in which it is shown in FIGS. 2 and 5 by means of a latch arm 130 carrying at its outer end a roll 132. This arm is pivotally mounted by means of a pin 134 on a bracket member 136 which is secured to the base plate 20 by screws 138, 138. The armature 140 of a solenoid 142, mounted on the lower side of the base plate 20, engages the arm 130 and when the solenoid is energized exerts an upward force on the arm holding it in the operative position shown and with the roll 132 in engagement with an abutment plate 144, secured to the gate member 106. A coil spring 146, stretched between a pin 148 on the arm 130 and a pin 150 carried by the solenoid tends at all times to swing the arm 130 in a clockwise direction, to the extent determined by a fixed stop associated with the solenoid, thus to release the gate 106 to the action of a coil spring 152, FIG. 5, when the solenoid is deenergized. As shown in FIG. 3 the gate member 106 is stabilized in a vertical direction by a roll 160 rotatably mounted on a bracket member 162 secured to the lower side of the gate member, and this roll rides in a U-shaped guide track 164, formed in a member 166 mounted on the base plate 20.

The latch lever 100 carries a second roll 170, mounted on a downwardly extending boss 172 at a lower level than the roll 102, see FIG. 1. This roll is in the same horizontal plane as a pair of driving lugs 176, 176 formed on and projecting above the upper side of main driven gear 36. When the parts are in the positions shown in FIG. 5, however, this roll is located radially just beyond the path of movement of these two lugs. Extending downwardly from the left-hand end of the gate member 106 is projection 180 having a camming surface 182 adapted to be engaged by a cam roll 184, rotatably mounted on the upper side of the gear 36. The pinion 38 is mounted on the output shaft 186 of a combined electric motor and gear reduction unit, diagrammatically illustrated and identified by the reference character 188 in FIG. 1. This unit is suspended from the lower side of the base plate 20 and the shaft 186 extends upwardly through a hole therein.

Supported on the disc-like member 74 by means of a block 190 is a switch operating cam 192. This cam is shaped to provide a circumferential series of lobes, not shown, which are adapted to actuate three microswitches 194, 196 and 198, see FIG. 6, by engagement with rolls 200, 202, 204 associated, respectively, with these switches, as the valve stem assumes different angular positions. Thus, when the valve is fully opened, with the parts of the valve operating mechanism in the positions shown in the drawings, switch 194 will be shifted by its associated cam lobe to a position to open the circuit to the motor of the combined motor-gear reduction unit 188 and at the same time to close the circuit to a "valve open" signal light 210, see FIG. 4. Now, as the valve stem 30 and valve stem extension 32 are turned in a direction, clockwise FIGS. 5 and 6, to move the valve to closed position, switch 196 will be closed, thus closing the circuit to a "valve not closed" light 212. This switch opens just as the valve is fully closed and switch 198 is moved to close the circuit to a "valve closed" light 214. FIG. 4 shows these switches in the positions assumed when the valve is fully closed.

FIGS. 1, 5 and 6 show the valve operating mechanism parts in positions assumed when the valve is fully opened. Thus, rotation of the drum 42 by the spring 90 in a clockwise direction is prevented by the engagement of the roll 102 on the latch lever 100 with the notch 104 formed in the gate member 106. The gate member, in turn, is held in the operative position shown by the latch lever 130, see FIG. 2. Finally, the latch lever 130 is elevated to the operative position shown by the armature 140 of the energized solenoid 142. Upon deenergization of this solenoid, the latch arm 130 will be pulled downwardly by the spring 146, while the gate member 106 will be swung in a clockwise direction, FIG. 5, by the action of the roll 102 thereon and by the spring 152 to the dotted-line position, thus releasing the drum 42 for rotation by the spring 90 in a direction and to an extent sufficient to turn the valve to closed position.

To reset the valve to open position, a remotely located located switch 220, FIG. 4, is closed to reenergize the solenoid 142 and also to supply current to the motor of the unit 188, switch 194 having been returned to the position shown in FIG. 4 as the valve began to close. Gear 36 is now rotated, in a counterclockwise direction, as viewed from above in FIG. 5, and the cam roll 184 thereon engages the cam surface 182 on the gate member 106 which, when released by the latch arm 130, had assumed the position shown in broken lines and as determined by engagement with a stop block 222. The gate member is now swung in a counterclockwise direction by the action of roll 184 on surface 182 and returned to the position shown in solid lines FIG. 5. Just as the gate member reaches this position, the latch arm 130 is moved upwardly by the armature 140 of the soelnoid 142, thereby latching the gate member in its operative position, and roll 184 passes by the end of cam surface 182.

As gear 36 continues to be rotated, one of the lugs 176 on this gear contacts the roll 170 on the latch lever 100, previously moved into the path of movement of this lug by the closing of the gate member 106, see dotted line position, FIG. 5. The drum 42 is now rotated reversely, counterclockwise in FIG. 5, by the action of the lug on roll 170, against the resistance of the constant torque spring 90 and, after the lost motion between the lugs 80 and 76 has been taken up, the continued rotation of the drum, acting through the valve stem extension 32, turns the valve to open position. Just as the valve reaches open position, the roll 102 on the latch lever 100, which had been rolling along an arcuate surface 224 on the gate member 106, drops into the notch 104 on the latch arm 106, thereby swinging the roll 170 outwardly just beyond the path of the lug 176 and locking the drum 42 against rotation by spring 90. Switch 194 will now be shifted to open the circuit to the motor and to close the circuit to the signal light 210. The valve will remain in open position until a switch 230, FIG. 4, is manually opened, thus deenergizing the coil 232 of a relay. Also, of course, in the supply of electrical energy to the power lines 234, 236, FIG. 4, solenoid 142 will be deenergized and the valve will immediately be returned to closed position by spring 90.

Under some operating conditions, especially for operating large valves, it is desirable to separate the resetting of the valve to open position into two separate steps, first recocking the valve closing drum 90 and then returning the valve to open position. For this purpose the valve operating mechanism which has just been described may be modified in the following respects.

Figure 7:
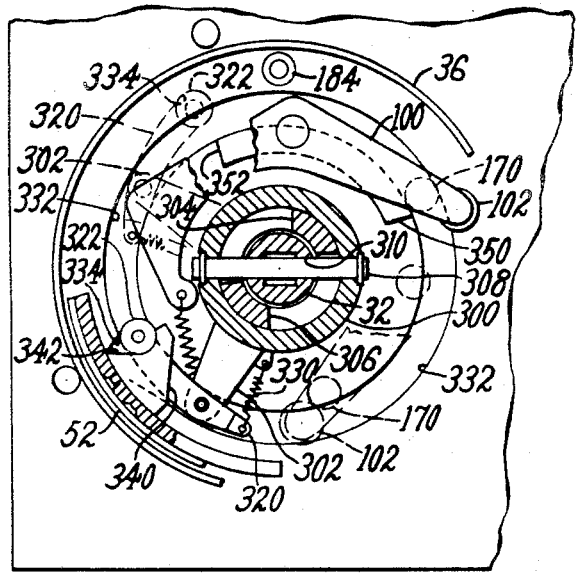
FIG. 7 is a plan view, corresponding to FIG. 5, but showing a modified construction.
Figure 8:
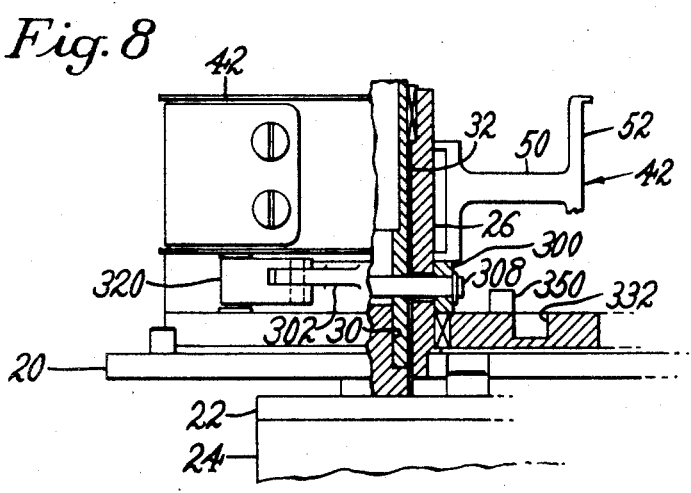
FIG. 8 is a view, partly in end elevation and partly in vertical section, of the modified construction shown in FIG. 7.

Referring to FIGS. 7–10, a spacer member 300, corresponding to bushing 48, is rotatably mounted on the hollow post 26, FIG. 8, and is provided with a radially extending arm 302. The post 26 is slotted at 304, 306 and a drive pin 308 carried by the member 300 extends through these slots and through a bore 310 in the valve stem extension 32. The slots 304, 306 are slightly more than 90° in arcuate extent to permit a 90° rotation of the valve stem 30 as the valve is turned from the open position shown to closed position, these two positions being determined by the the fixed stops 62, 62, FIG. 6, as explained above.

Figure 9:
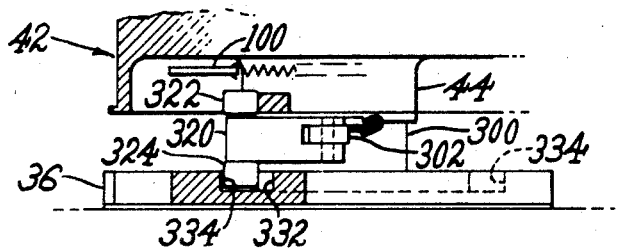
FIGS. 9 and 10 are detail views, in elevation, of portions of the modified construction shown in FIGS. 7 and 8.
Figure 10:
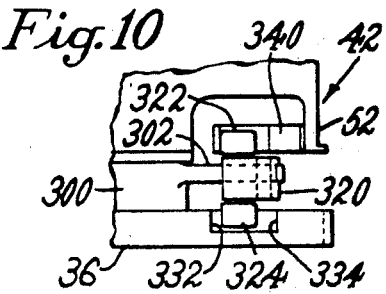

Pivotally mounted on the outer end of the arm 302 is a lever 320 carrying upper and lower cam rollers 322 and 324, see FIGS. 9 and 10. A coil spring 330 tends to swing the lever 320 in a counterclockwise direction as viewed in FIG. 7. The lower roll 324 rides in a cam track 332, formed in the upper side of the gear 36 and provides with a notch 334, FIG. 7. Secured to the lower portion of the outer flange 52 of the drum 42 is a radially extending abutment member 340 provided with a cam surface 342 adapted to engage the upper roll 322 and swing the lever 320 in a clockwise direction to lift the roll 324 out of the notch 334. Projecting upwardly from the gear 36 is a rib 350 providing at one end a radially extending abutment surface 352.

In FIG. 7 the parts are shown in the position assumed when the valve is being held in open position by the engagement of the roll 102 of the latch lever 100 in engagement with the notch 104 of the gate member 106, see FIG. 5. Now, when solenoid 142 is deenergized by actuation of switch 230 or due to failure of electrical power, the gate member will be released as will also the roll 102. Spring 90 will now rotate the drum 42 in a clockwise direction. Lugs 80, 80 previously utilized to effect rotation of the valve by the drum 42, are now omitted and movement of the valve to closed position, still determined by the engagement of lugs 76, 76 with the fixed stop 62, is effected by engagement of the abutment member 340 with the roll 322 which rotates the member 300 in clockwise direction for about 90°, see broken line position of arm 302, FIG. 7, roll 324 now travelling freely along cam track 332.

When the solenoid 142 and the motor of unit 188 are again energized, for the purpose of resetting the valve to open position, the gear 36 is rotated in a counterclockwise direction. During the first 180° rotation of this gear, roll 324 will travel freely along the cam track 332 and the abutment surface 352 will engage roll 170. Now the latch lever 100 and roll 102 will be returned to the positions shown in FIG. 7, during the next 90° rotation of gear 36, thus recocking the spring 90 and latching the drum 42 in the position shown in FIG. 4. As roll 102 enters the notch 104 in the gate member 106, roll 170 swings out beyond the abutment surface 352 and roll 324 rides down into engagement with notch 334, at about 270° of rotation of the gear, see broken lines in FIG. 7. During the following 90° rotation, the roll 324 is carried along by the gear thus rotating member 300 and returning the valve to open position. Just as the valve reaches open position, as determined by the engagement of a lug 76 with the fixed stop 62, roll 324 is lifted out of the notch 334, by cam surface 342, to permit a slight over-travel of the gear which may occur after switch 194 is moved to a position to open the circuit to the motor 188 and close the circuit to lamp 210.

As shown in FIG. 6, and see also FIG. 1, the switches 194, 196 and 198 are mounted on a platform 400 which in turn is supported on the upper ends of the guide track 164 and stop block 222, the latter two members being omitted from FIG. 1 to simplify the disclosure. Preferably, and as shown in FIG. 1, the valve operating mechanism is enclosed in upper and lower cover members 410 and 420 which are secured to the base plate 20 by means of integrally formed ears and screws, not shown. The upper cover member 410 is formed with a boss-like protuberance 430 provided with openings 440, 440 through which the indicator cup 72 may be viewed to determine the position of the valve.

The operation of the novel valve operating mechanism will be clear from the above description. Also the several practical advantages of this novel construction should be apparent. Thus, the compact and unitary arrangement of the valve operating components on a base member which is adapted to be mounted adjacent to or directly on the valve body simplifies installation. The utmost dependability of operation, especially in the closing of the valve, when instigated by an operator or in the event of power failure, is assured inasmuch as the valve operating drum is fully released, upon deenergization of the solenoid 142, to the action of the constant torque spring 90 which always exerts the same force on the drum tending to close the valve from the time the valve starts to close until it is fully closed, with no tendency to "fade out" as the valve approaches closed position. Conversely, in the resetting of the valve to open position and cocking of the spring, the resistance offered to the power source 188 is the same with no build up as the valve approaches open position. Accordingly, the power requirements can be nicely judged and the most suitable power unit for the particular valve to be operated can be confidently selected. Also, a truly "fail safe" arrangement is provided inasmuch as at every position assumed by the valve there is always stored in the spring 90 more than sufficient energy to instantly and fully close the valve.

As suggested above, in the embodiment shown in FIGS. 1-6, the cooperating drive means between the valve operating drum and the valve stem provides a degree of lost motion which, by virtue of the resulting impact action, facilitates initial movement of the valve in either direction. As will be observed in FIG. 5 the roller 102 and notch 104 are so disposed that the roll constantly tends to swing the gate member to its inoperative position, thus assuring release of the drum to the action of spring 90 even in the event of failure of spring 152. Also, by utilizing the cam roll 184 on the gear 36 for returning the gate member to operative position, just before the other lug 176 has engaged roll 170 to rotate the drum back to its valve open position, the mechanism is greatly simplified. Further, by virtue of the arrangement provided in the modifiction illustrated in FIGS. 7-10 wherein the drum is recocked and the valve opened in two separate steps, the power requirements are significantly reduced, thus effecting further economies.

Having described the invention, what is claimed as new and desired to secure by United States Letters Patent is:

1. Mechanism for operating a rotary valve having a valve member rotatable to open and closed positions for controlling the flow of fluid through the valve and an operating stem, comprising a base member having an opening and provided with a hollow post mounted directly on said base member and said post's hollow overlying and substantially co-axial with portions of said base surrounding said opening, said base member being adapted to be mounted adjacent to the valve to be operated with the hollow post surrounding the valve operating stem, a valve operating drum rotatably mounted on said post, means exerting a force tending to rotate the drum in one direction, means associated with the drum and the valve stem for rotating the valve stem to move the valve member to closed position in response to rotation of the drum in said one direction, means mounted on the base member for rotating the drum in the opposite direction, means associated with the drum and the valve stem for rotating the valve stem to move the valve member to open position in response to rotation of the drum in said opposite direction, and cooperating means mounted on said base member and carried by the drum for releasably holding the drum against rotation by said force exerting means in the direction to move the valve member to closed position.

2. Mechanism for operating a rotary valve as set forth in claim 1, wherein said releasable holding means includes a holding member, a solenoid having an armature adapted to render the holding member operative to hold the drum and valve stem against rotation by said force exerting means when its coil is energized and a spring for rendering the holding member inoperative when the coil of the solenoid is deenergized.

3. Mechanism for operating a rotary valve as set forth in claim 1, wherein the releasable holding means comprises a gate member pivotally mounted on the base member for movement between operative and inoperative positions, a spring for moving the gate member to inoperative position, means including a solenoid adapted to hold the gate member in operative position when its coil is energized, and a latch member carried by the drum cooperating with the gate member to prevent rotation of the drum by the force exerting means when the gate member is held in operative position by the solenoid.

4. Mechanism for operating a rotary valve as set forth in claim 1, wherein said releasable holding means comprises a gate member pivotally mounted on the base member for movement between operative and inoperative positions, a cooperating latch lever carried by the drum and adapted to engage the gate member to prevent rotation of the drum by said force exerting means to move the valve member to closed position when the gate member is in operative position, a latch arm pivotally mounted on the base member and adapted when held in operative position to engage the gate member and hold it in operative position, a solenoid having an armature for holding the latch arm in operative position when its coil is energized and spring means for moving the latch arm to inoperative position and for moving the gate member to inoperative position, thereby to release the drum to the action of the force exerting means when the coil of the solenoid is de-energized.

5. Mechanism for operating a rotary valve as set forth in claim 1, wherein the means associated with the drum and the valve stem for rotating the valve stem in response to rotation of the drum comprises a pair of driving lugs on the drum and a pair of driven lugs associated with the valve stem, said lugs being so angularly disposed as to provide a predetermined lost motion between rotation of the drum in either direction and the resulting rotation of the valve stem.

6. Mechanism for operating a rotary valve having a valve member rotatable to open and closed positions for controlling the flow of fluid through the valve and an operating stem, comprising a base member adapted to be mounted adjacent to the valve to be operated, a valve operating drum rotatably mounted on the base member, spring means for rotating the drum in one direction, cooperating drive means associated with the drum and the valve stem for rotating the valve stem to move the valve member to closed position in response to rotation of the drum in said one direction, means mounted on the base member for rotating the drum and the valve stem in the opposite direction to cock the drum and to move the valve member to open position, said means including a driven rotary member and mechanism for connecting the driven member first to the drum to effect cocking thereof and then to the valve stem to move the valve member to open position, and means for releasably holding the drum against rotation by the spring means.

7. Mechanism for operating a rotary valve as set forth in claim 6, wherein said mechanism includes a pair of driving abutments on the driven member and a pair of cooperative abutment members associated, respectively, with the drum and the valve stem.

8. Mechanism for operating a rotary valve as set forth in claim 7, wherein the means for releasably holding the drum against rotation includes a latch lever carrying one of said abutment members.

9. Mechanism for operating a rotary valve having a valve member rotatable to open and closed positions for controlling the flow of fluid through the valve and an operating stem, comprising a base member adapted to be mounted adjacent the valve, a valve operating drum rotatably mounted on the base member, cooperating drive means associated with the valve stem and the drum for effecting rotation of the valve stem by said drum, a spring for rotating the drum in one direction to move the valve member to closed position, means for rotating the drum in the opposite direction to move the valve member to open position and to cock the drum against the force of said spring, said means including a driven rotary member provided with a driving lug, and means carried by the drum and movable into one position for holding the drum against rotation by the spring and into another position for releasing the drum and for cooperating with said driving lug for rotation of the drum in said opposite direction.

10. Mechanism for operating a rotary valve as set forth in claim 9, wherein the means carried by the drum comprises a latch lever provided with a first roll for holding the drum against rotation and a second roll for cooperating with the driving lug.

11. Mechanism for operating a rotary valve having a valve member rotatable to open and closed positions for controlling the flow of fluid under pressure through the valve and an operating stem, comprising a base member adapted to be mounted adjacent the valve, a valve operating drum rotatably mounted on the base member, cooperating drive means associated with the valve stem and the drum for effecting rotation of the valve stem by said drum, spring means for rotating the drum in one direction to move the valve member to closed position, a driven rotary member provided with a lug for rotating the drum in the opposite direction to move the valve member to open position, a gate member carried by the base member, a latch lever pivotally mounted on the drum and movable into one position for cooperating with the gate member to hold the drum against rotation by the spring and into another position for cooperating with the driving lug to cause the drum to be rotated in said opposite direction by the driven rotary member.

12. Mechanism for operating a rotary valve as set forth in claim 11, wherein said latch lever carries one roll for cooperating with the gate member and another roll for cooperating with the driving lug.

13. Mechanism for operating a rotary valve having a valve member rotatable to two different positions for controlling the flow of fluid through the valve and an operating stem, comprising a base member adapted to be mounted adjacent the valve, a valve operating drum rotatably mounted on the base member, cooperating drive means associated with said drum and the valve stem for rotating the valve stem to move the valve member in response to rotation of the drum, spring means for rotating the drum in one direction to move the valve member to one of its two positions, a gate member carried by the base member and movable between operative and inoperative positions, spring means tending to move the gate member from operative to inoperative position, means for releasably holding the gate member in operative position, means on the drum adapted to engage the gate member when it is in operative position for holding the drum against rotation by the first mentioned spring means, and means carried by the base member for first moving the gate member to operative position and then rotating the drum in the opposite direction, against the action of the first mentioned spring means, to move the valve member to the other one of its two positions and to bring the drum holding means into engagement with the gate member.

14. Mechanism for operating a rotary valve as set forth in claim 13, wherein the means for moving the gate member to operative position and for rotating the drum in said opposite direction comprises a driven rotary member mounted on the base member and provided with a first lug adapted to engage a cam surface on the gate member and a second lug for engaging an abutment surface on the drum.

15. Mechanism for operating a rotary valve as set forth in claim 14, wherein the means for engaging the gate member comprises a latch lever having a pair of rolls, one of which is adapted to engage the gate member when it is in operative position to hold the drum against rotation by the first named spring means and the other to be engaged by the second named lug on said driven rotary member.

References Cited
UNITED STATES PATENTS

| | | | |
|---|---|---|---|
| 2,992,807 | 7/1961 | Karlby et al. | 251—76 |
| 3,085,781 | 4/1963 | LaPointe | 251—69 X |
| 3,279,744 | 10/1966 | Fieldsen et al. | 251—71 X |

ROBERT W. MITCHELL, Primary Examiner

LEON G. MACHLIN, Assistant Examiner

U.S. Cl. X.R.

251—71, 76

UNITED STATES PATENT OFFICE
CERTIFICATE OF CORRECTION

Patent No. 3,466,005    Dated Sept. 9, 1969

Inventor(s) Gunther K. E. Kleeberg

It is certified that error appears in the above-identified patent and that said Letters Patent are hereby corrected as shown below:

Col. 1, line 51, " principle " should read -- principal --.
Col. 5, line 1, " located " should be cancelled ; line 15,
" soelnoid " should read -- solenoid -- ; line 39, after
" in ", the following words should be inserted -- the case
of failure of -- ; and lines 67,68, " provides " should
read -- provided --.

SIGNED AND
SEALED
MAY 12 1970

(SEAL)
Attest:

Edward M. Fletcher, Jr.
Attesting Officer

WILLIAM E. SCHUYLER, JR.
Commissioner of Patents